(12) United States Patent
Peter et al.

(10) Patent No.: US 7,491,309 B2
(45) Date of Patent: Feb. 17, 2009

(54) SYSTEM AND METHOD FOR THE PRODUCTION OF HYDROGEN

(75) Inventors: Andrew Maxwell Peter, Saratoga Springs, NY (US); Chellappa Balan, Niskayuna, NY (US); James Anthony Ruud, Delmar, NY (US); Stephane Renou, Clifton Park, NY (US); Kenneth Walter Browall, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 360 days.

(21) Appl. No.: 11/314,137

(22) Filed: Dec. 21, 2005

(65) Prior Publication Data

US 2007/0138022 A1    Jun. 21, 2007

(51) Int. Cl.
C25C 7/06    (2006.01)
(52) U.S. Cl. ............. 205/629; 205/630; 205/634; 205/637; 205/638; 204/263; 204/265; 204/266; 204/253; 204/258
(58) Field of Classification Search ............... 204/263, 204/265, 266, 253, 257, 258; 205/629, 630, 205/634, 637, 638
See application file for complete search history.

(56) References Cited

U.S. PATENT DOCUMENTS 5,479,462 A * 12/1995 Yamauchi et al. .......... 376/325

2003/0012997 A1 * 1/2003 Hsu ............................. 429/34

FOREIGN PATENT DOCUMENTS

WO    WO 96/23322    8/1996

OTHER PUBLICATIONS

Patent Abstracts of Japan. JP03208259 A. Publication Date Sep. 11, 1991. "Solid Electrolyte Fuel Cell System". (Abstract Only).
Patent Abstracts of Japan. JP04087976 A2. Publication Date Mar. 19, 1992. "Packaging Device For Electrolytic Condenser". (Abstract Only).
Patent Abstracts of Japan. JP04254796 A2. Publication Date Sep. 10, 1992. "Direct Reduction Of Metal Ore". (Abstract Only).
Patent Abstracts of Japan. JP06093481 A2. Publication Date Apr. 5, 1994. "Method For Electrolyzing High Temperature Steam". (Abstract Only).

(Continued)

*Primary Examiner*—Bruce F Bell
(74) *Attorney, Agent, or Firm*—Francis T. Coppa

(57) ABSTRACT

Disclosed herein are a system and a method for the production of hydrogen. The system advantageously combines an independent high temperature heat source with a solid oxide electrolyzer cell and a heat exchanger. The heat exchanger is used to extract heat from the molecular components such as hydrogen derived from the electrolysis. A portion of the hydrogen generated in the solid oxide electrolyzer cell is recombined with steam and recycled to the solid oxide electrolyzer cell. The oxygen generated on the anode side is swept with compressed air and used to drive a gas turbine that is in operative communication with a generator. Electricity generated by the generator is used to drive the electrolysis in the solid oxide electrolyzer cell.

36 Claims, 3 Drawing Sheets

OTHER PUBLICATIONS

Figure 1:
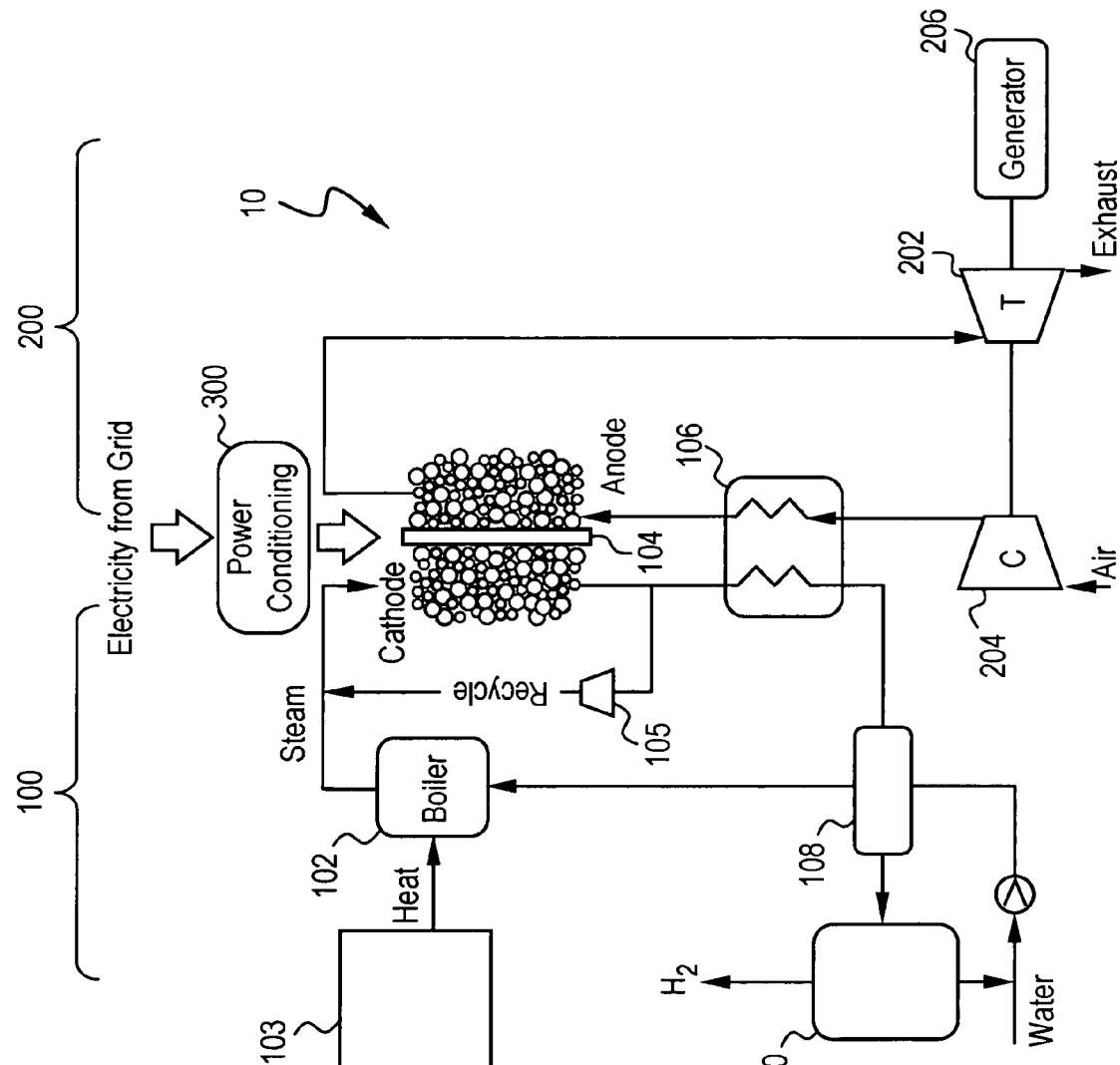

Patent Abstracts of Japan. JP06276701 A2. Publication Date Sep. 30, 1994. "Electric Power Storing Device". (Abstract Only).
Patent Abstracts of Japan. JP21160404 A2. Publication Date Jun. 12, 2001. "Power Storage System". (Abstract Only).
Patent Abstracts of Japan. JP09004418. Publication Date Jan. 7, 1997. "Hydrogen Combustion Power Storage Device". (Abstract Only).

* cited by examiner

SYSTEM AND METHOD FOR THE PRODUCTION OF HYDROGEN

BACKGROUND

This disclosure relates to a system and a method for the production of hydrogen. In particular, this disclosure relates to a system and a method for the production of hydrogen using a solid oxide electrolyzer in conjunction with a high temperature heat source.

Fossil fuel combustion has been identified as a significant contributor to numerous adverse environmental effects. For example, poor local air quality, regional acidification of rainfall that extends into lakes and rivers, and a global increase in atmospheric concentrations of greenhouse gases (GHG), have all been associated with the combustion of fossil fuels. In particular, increased concentrations of GHG's are a significant concern since the increased concentrations may cause a change in global temperature, thereby potentially contributing to global climatic disruption. Further, GHG's may remain in the earth's atmosphere for up to several hundred years.

One problem associated with the use of fossil fuel is that the consumption of fossil fuel correlates closely with economic and population growth. Therefore, as economies and populations continue to increase worldwide, substantial increases in the concentration of GHG's in the atmosphere are expected. A further problem associated with the use of fossil fuels is related to the inequitable geographical distribution of global petroleum resources. In particular, many industrialized economies are deficient in domestic supplies of petroleum, which forces these economies to import steadily increasing quantities of crude oil in order to meet the domestic demand for petroleum derived fuels.

Electrolyzers are an approach for producing hydrogen either at large central facilities or distributed at the point of use. An electrolyzer uses electricity to separate or split water into its components—hydrogen and oxygen. Today, two types of electrolyzers are used for the commercial production of high-purity hydrogen—alkaline and proton exchange membrane (PEM). But these approaches cannot currently compete, on an economic basis, with hydrogen produced by steam methane reforming (SMR) of natural gas.

However, SMR is highly dependent on the price and availability of natural gas. SMR also produces large amounts of carbon dioxide (generally about 12 kilograms of carbon dioxide equivalent per kg of hydrogen produced).

Systems have been proposed that couple a solid oxide electrolysis system to a helium-cooled nuclear reactor heat source using a steam Rankine cycle. High pressure steam is generated in a boiler heated by a primary loop that uses helium as a coolant. The high pressure steam is partially expanded through a steam turbine to produce electrical energy. A portion of the partially expanded steam is then reheated through a second heat exchanger heated by the helium from the primary loop. This intermediate pressure reheated steam can then be used for applications such as solid oxide electrolysis. This type of system risks steam ingress into the nuclear core due to the high-pressure steam generators, where the steam can be at a higher pressure than the primary helium coolant. Steam ingress into the core is undesirable because it can corrode the graphite moderator and graphite-coated fuel, and can also cause a reactivity insertion due to the moderating effect of steam. A further shortcoming of these systems is that the electrical generation and hydrogen generation are coupled together in the same system and are in fluid communication with each other, making the system inflexible and potentially not optimized.

Solid oxide electrolysis systems have been proposed that do not comprise an air compressor operative to sweep oxygen produced in the anode of the cell out of the cell. Instead, these systems allow the oxygen produced to accumulate in the anode until a sufficient oxygen pressure is achieved to collect and store this high-purity oxygen at pressure. These systems will require additional electrical energy to drive the electrolysis of steam into hydrogen and oxygen because of the high oxygen partial pressure on the anode side of the cell. Additionally, these systems may be limited to low current densities and therefore low hydrogen production per unit area of cell because these systems do not have a sweep gas to remove waste heat from the anode.

Solid oxide electrolysis systems have been proposed that comprise an air compressor operative to sweep oxygen produced in the anode of the cell out of the cell, and further comprise a heat exchanger to preheat this air prior to injection into the anode by transferring heat from the helium exiting the nuclear reactor core. These systems thus require an additional heat exchanger that interfaces with the nuclear reactor, which incurs additional cost and introduces a risk of air ingress into the nuclear reactor.

Solid oxide electrolysis systems have been proposed that utilize steam to sweep the oxygen produced at the anode side of the cell and further to remove waste heat produced at the anode side of the cell. These systems may suffer corrosion or loss of performance of the anode due to the presence of steam at the anode.

In order for electrolyzer systems to be commercially viable, reduced capital cost and increased system efficiency are desirable. It is therefore desirable to use high-temperature solid oxide electrolyzers that can make use of a high-temperature heat source, such as helium-cooled nuclear reactor to reduce the amount of electrical energy required to drive the electrolysis process.

SUMMARY

Disclosed herein is a hydrogen producing system comprising a solid oxide electrolyzer cell having a cathode side and an anode side; wherein the cathode side comprises a heat exchanger that lies down stream of an outlet of the solid oxide electrolyzer cell; a high temperature heat source that generates steam in a boiler at a temperature of about 700 to about 900° C. and a pressure of about 3 to about 20 kg/cm$^2$; and wherein the boiler is located upstream of the solid oxide electrolyzer cell; and further wherein the boiler is in fluid communication with an inlet located at the cathode side of the solid oxide electrolyzer cell; and wherein the anode side comprises a compressor located upstream of the solid oxide electrolyzer cell wherein the compressor is operative to blow air to sweep oxygen generated at the solid oxide electrolyzer cell to a turbine; and the heat exchanger, wherein the heat exchanger lies upstream of an inlet on the anode side of the solid oxide electrolyzer cell; and wherein the heat exchanger is operative to extract heat from the steam and hydrogen emanating from the cathode side of the solid oxide electrolyzer cell; and further wherein a portion of the heat extracted is transferred to air that is provided to the anode side of the solid oxide electrolyzer cell.

Disclosed herein too is a method comprising generating steam at a temperature of about 700 to about 900° C. and a pressure of about 3 to about 20 kg/cm$^2$ using a high temperature heat source; electrolyzing the steam to form hydrogen and oxygen in a solid oxide electrolyzer cell; extracting heat from the hydrogen and steam to heat air in a heat exchanger; and sweeping the oxygen from an anode side of the solid oxide electrolyzer cell to a turbine; wherein the sweeping the oxygen is conducted with compressed air generated in a compressor.

DETAILED DESCRIPTION OF FIGURES

Figure 2:
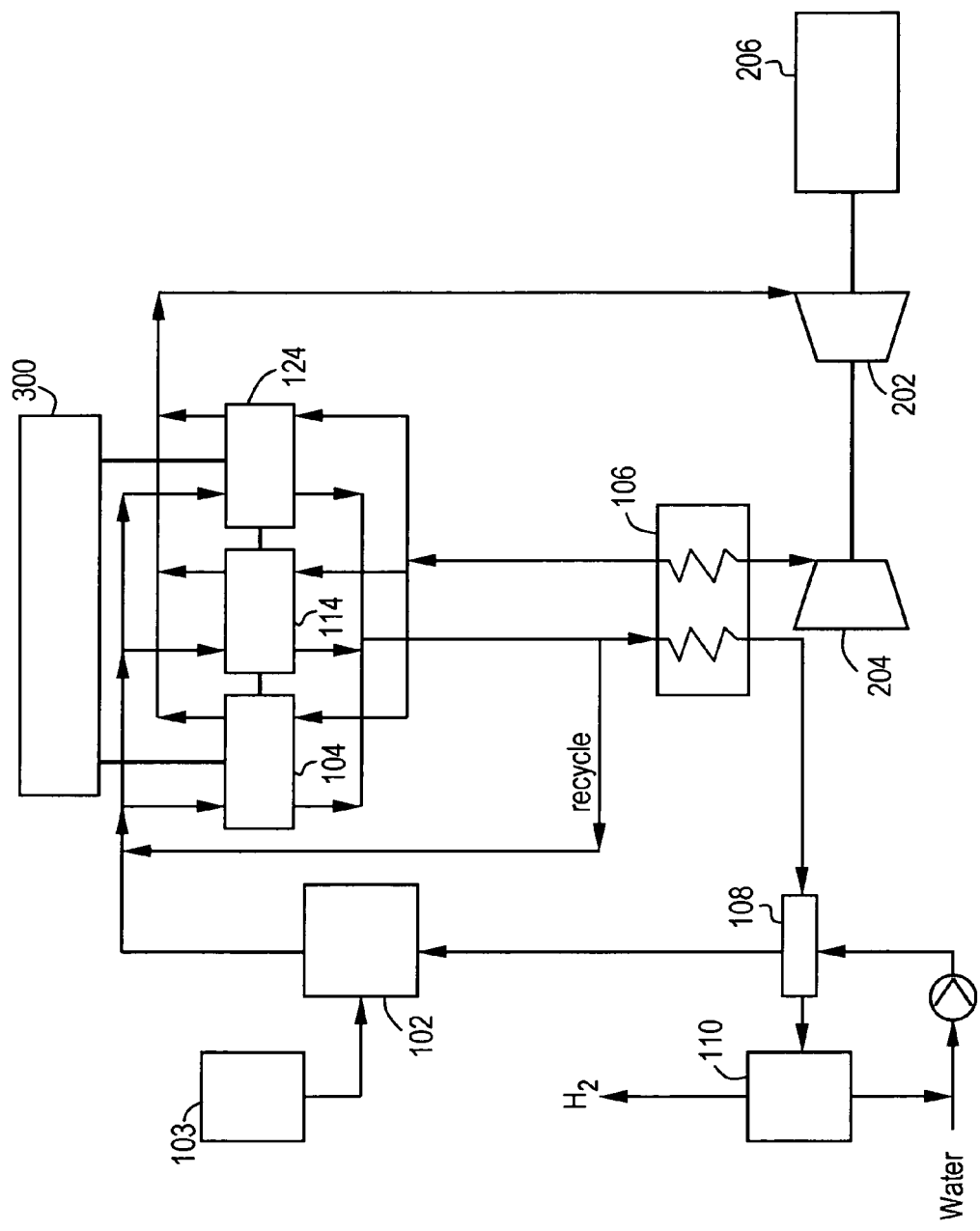
Figure 3:
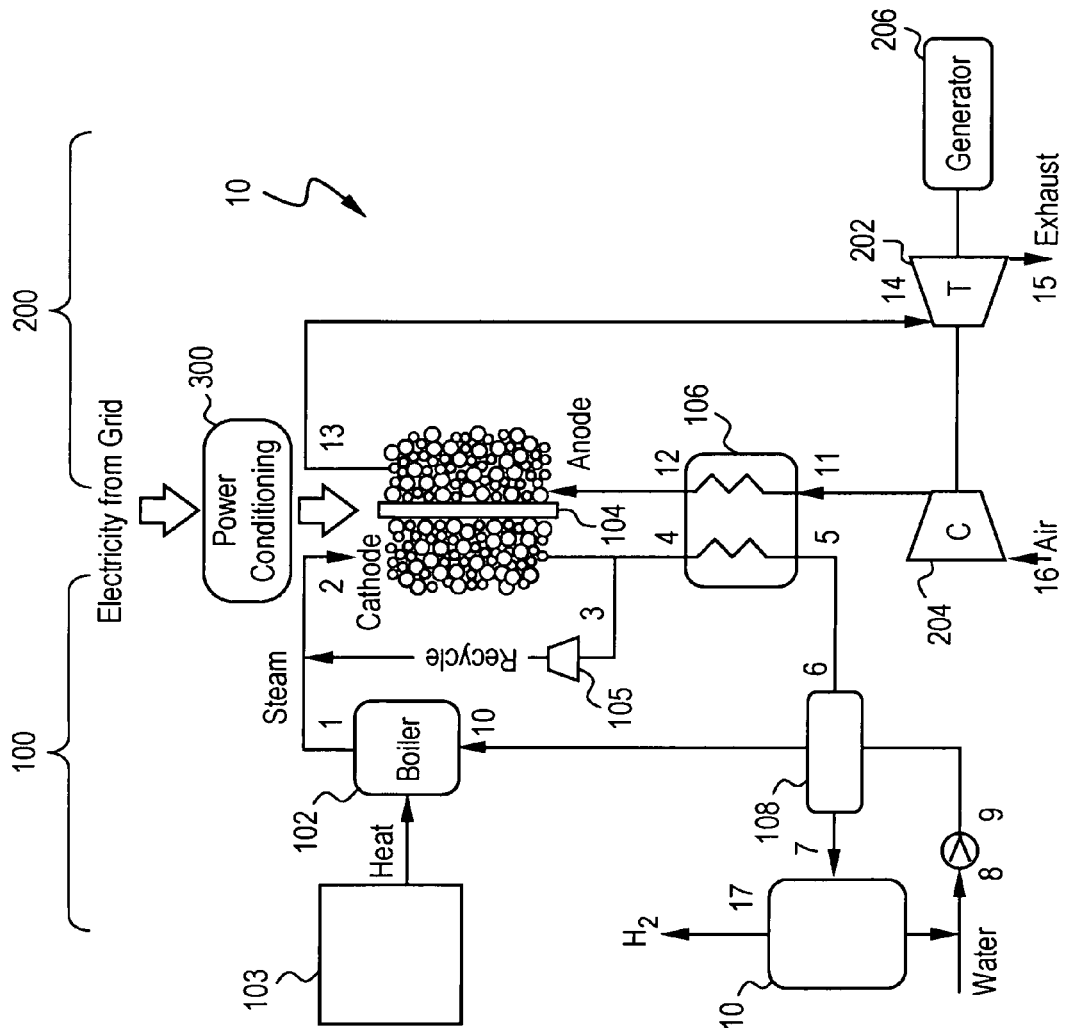

FIG. 1 depicts an exemplary embodiment of the hydrogen producing system 10 that comprises a single solid oxide electrolyzer cell 104, a boiler 102, a high-temperature heat source 103, a heat exchanger 106, a feed water heater 108, a condenser 110, a compressor 204, and a turbine 202;

FIG. 2 depicts an exemplary embodiment of the hydrogen producing system 10, (check numbers) that comprises a plurality of solid oxide electrolyzer cells 104, 114, 124 and the like. The solid oxide electrolyzer cells 104, 114, 124 and the like, are in parallel fluid communication with one another and in series electrical communication with one another to form a stack; and FIG. 3 depicts an exemplary embodiment showing pressure and temperature values at selected points in the system.

DETAILED DESCRIPTION

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recycle loop.

Disclosed herein is a hydrogen producing system that uses a heat source that is independent from the source of electricity. This method of producing hydrogen is advantageous in that it combines a potentially least expensive source of heat with a potentially least expensive source of electricity thereby resulting in an inexpensive method of hydrogen generation. In other words, a heat cycle used for the generation of hydrogen can be optimized separately and independently from whatever cycle is used to produce the majority of the electricity desired. This method advantageously results in hydrogen generation in an efficient manner and at the lowest possible cost.

The electrolysis of steam advantageously uses less electrical energy input than the electrolysis of water (for generating the same amount of hydrogen and oxygen). The electrolysis of water is generally conducted in other electrolyzers such as alkaline or proton exchange membranes (PEM). In the electrolysis of steam, some of the energy required to decompose water can be provided by heat, which reduces the electrical input required. The integration of a solid oxide electrolyzer cell with a cost-effective heat source, then, reduces the total cost of hydrogen production. Solid oxide electrolyzer systems that are not integrated with an independent heat source are generally disadvantageous since those that are not integrated with an independent heat source generally use reducing gases on the anode side of the electrolyzer to depolarize the cell and thus reduce the electrical input. These reducing gases add system complexity and cost and can have a detrimental effect on the life of the materials of construction used in the electrolyzer.

As will be seen below, the hydrogen producing system comprises a solid oxide electrolyzer cell, an inexpensive independent heat source, an independent source of electricity, a heat exchanger and a compressor. The solid oxide electrolyzer cell facilitates the dissociation of a working medium into molecular components. The inexpensive independent heat source provides thermal energy to the solid oxide electrolyzer cell. The independent source of electricity provides electrical energy to the solid oxide electrolyzer cell, while the heat exchanger permits the transfer of thermal energy from the outgoing molecular components generated in the solid oxide electrolyzer cell to the incoming components prior to entering the solid oxide electrolyzer cell.

With reference now to the FIG. 1, the hydrogen producing system 10 comprises a cathode side loop 100, an anode side loop 200 and an independent electrical grid 300 for supplying electricity to the hydrogen producing system 10.

The cathode side loop 100 comprises a boiler 102, a high temperature heat source 103, a solid oxide electrolyzer cell 104, a heat exchanger 106, a feed water heater 108 and a condenser 110. The anode side loop 200 comprises the heat exchanger 106, a turbine 202, a compressor 204 and an electrical generator 206.

The cathode side loop 100 comprises a boiler 102 that is in fluid communication with the cathode side of a solid oxide electrolyzer cell 104. The solid oxide electrolyzer cell 104 is located downstream of the boiler 102. The boiler generates steam from water and further superheats the steam using thermal energy from a high-temperature heat source 103. The boiler 102 supplies superheated steam to the cathode side of the solid oxide electrolyzer cell 104 for efficient electrolysis into hydrogen and oxygen. As noted above, the electrolysis of steam uses less electrical energy input than the electrolysis of water. In an exemplary embodiment, the high temperature heat source 103 can be a nuclear reactor.

The solid oxide electrolyzer cell 104 electrolyzes a portion of the steam into hydrogen and oxygen. In one exemplary embodiment, a portion of the exhaust (e.g., hydrogen and residual unconverted steam) from the cathode side of the solid oxide electrolyzer cell 104 is recycled to the inlet of the cathode. As can be seen in the FIG. 1, a heat exchanger 106, a feed water heater 108 and a condenser 110 all lie downstream of the solid oxide electrolyzer cell 104 and are in fluid communication with the solid oxide electrolyzer cell 104 and with each other. The feed water heater 108 and the condenser 110 both lie downstream of the heat exchanger 106. The condenser 110 lies downstream of the feed water heater 108.

High temperature hydrogen generated at the solid oxide electrolyzer cell 104 along with residual unconverted steam from the electrolyzer 104 flows through the heat exchanger 106 where some of its heat energy is extracted to heat air that serves as the input to the anode side of the solid oxide electrolyzer cell 104.

The feed water heater 108 lies downstream of the solid oxide electrolyzer cell 104 and upstream of the condenser 110. In one embodiment, the feed water heater 108 and the condenser 110 can be made to lie in a recycling loop if desired. When the feed water heater and the condenser lie in a recycling loop, condensate obtained from the condenser 110 due to the condensation of steam is recycled to the feed water heater 108, along with make-up water. The water is preheated in the feed water heater 108 by absorbing waste heat from the residual steam as well as the hydrogen generated at the solid oxide electrolyzer cell 104. After being preheated in the feed water heater, the water is directed to the boiler 102 where it is converted to superheated steam.

As noted above, in one embodiment, the high temperature heat source 103 can be a nuclear reactor. When the high temperature heat source 103 comprises a nuclear reactor, it is desirable for the nuclear reactor to use helium as a coolant. In one embodiment, the high temperature heat source 103 is a nuclear reactor that employs machined graphite blocks as the moderator and as the core structural element. Coated fuel particles containing fissile material are compacted into cylindrical pellets and inserted into holes drilled into the graphite blocks. Helium coolant flows through additional holes drilled through the graphite blocks. In another embodiment, the nuclear reactor employs coated fuel particles containing fissile material that are compacted into pebbles. These pebbles are then assembled to form a "pebble bed" comprising the core of the reactor. Helium coolant flows between the pebbles. In another embodiment, the nuclear reactor can use molten salt as a coolant. Heat absorbed by the coolant is used to heat water to steam having a temperature of about 650 to about 900° C. and a pressure of about 3 to about 20 kg/cm².

The anode side 200 of the hydrogen producing system 10 comprises a turbine 202 for sweeping oxygen generated in the solid oxide electrolyzer cell 104. The turbine 202 is located downstream of the solid oxide electrolyzer cell 104 and is in mechanical communication with a compressor 204. The turbine 202 drives the compressor 204. The compressor 204 is located upstream of the solid oxide electrolyzer cell 104 and is used to pump compressed air into the anode side of the solid oxide electrolyzer cell 104. The compressed air from the compressor 204 along with the oxygen generated in the solid oxide electrolyzer cell 104 is used to drive the turbine, which transmits torque via a shaft to drive the compressor 204. In one exemplary embodiment, the turbine 202 is also in mechanical communication with an electrical generator 206. Excess torque from the turbine 202 drives the electrical generator 206. Electricity derived from the generator 206 may be used to partially drive the electrolysis of steam in the solid oxide electrolyzer cell 104.

With reference now again to the cathode side, the boiler 102 supplies steam at a temperature of about 650 to about 900° C. to the solid oxide electrolyzer cell 104. In one embodiment, the boiler 102 supplies steam to the solid oxide electrolyzer cell 104 at a temperature of about 700 to about 850° C. An exemplary temperature for the steam supplied to the solid oxide electrolyzer cell 104 is about 725 to about 775° C.

The steam generated by the boiler 102 is generally at a lower pressure than the steam used in a steam turbine. The pressure of the steam supplied by the boiler 102 to the solid oxide electrolyzer cell 104 is about 3 to about 20 kg/cm². In another embodiment, steam is supplied by the boiler to the solid oxide electrolyzer cell 104 at a pressure of about 4 to about 18 kg/cm². In another embodiment, steam is supplied by the nuclear reactor to the solid oxide electrolyzer cell 104 at a pressure of about 5 to about 15 kg/cm². In an exemplary embodiment, steam is supplied by the nuclear reactor to the solid oxide electrolyzer cell 104 at a pressure of about 6 to about 12 kg/cm².

In one embodiment, the solid oxide electrolyzer cell 104 is an intermediate temperature operating cell that functions at a temperature of about 700 to about 850° C. The solid oxide electrolyzer cell 104 may be tubular or planar in assembly. The solid oxide electrolyzer cell 104 is partitioned into an anode side and a cathode side by a hermetic membrane comprising a solid oxide electrolyte. Alternating-current (AC) electrical power supplied independently by the electrical grid 300 is converted into direct current (DC) electric power by an AC-DC converter, and the direct current electric power is supplied to the solid oxide electrolyzer cell 104. The electrical energy facilitates the conversion (electrolysis) of the high-temperature steam supplied to the cathode side into molecular hydrogen and negative oxygen ions. Oxygen ions pass through the solid oxide electrolyte to the anode, where they combine to form molecular oxygen. Hydrogen produced at the cathode side of the solid oxide electrolyzer cell 104 along with residual unconverted steam is then sent to the heat exchanger 106.

In one embodiment, the solid oxide electrolyzer cell 104 uses an electrolyte that comprises yttria-stabilized-zirconia (YSZ), gadolinia-doped-ceria, samaria-doped-ceria, or lanthanum-strontium-gallium-magnesium oxide. Suitable anode materials include mixed-ionic-electronic-conducting (MIEC) ceramics such as lanthanum-strontium-ferrite, lanthanum-strontium-cobaltite, or lanthanum-strontium-cobaltite-ferrite, and their combinations with an electrolyte material such as those listed above.

In one exemplary embodiment, the solid oxide electrolyzer cell 104 can further comprise an ion-conducting barrier layer to separate the anode from the electrolyte. For example, a suitable barrier layer that can be used between a YSZ electrolyte and a lanthanum-strontium-cobaltite-ferrite includes samaria-doped-ceria and gadolinia-doped-ceria. Suitable cathode materials include the composite Ni/YSZ. In one embodiment, the Ni/YSZ is used at the operating temperature. In an example according to this embodiment, the solid oxide electrolyzer cell 104 can further comprise a reducing environment maintained on the cathode side. For example, maintaining hydrogen in the steam feed in an amount of at least about 5 wt % (wherein the weight percent is based on the total amount of cathode exhaust) can provide a reducing environment on the cathode side.

In another embodiment, the solid oxide electrolyzer cell 104 uses an electrolyte-supported design. In one embodiment, the thickness of the electrolyte is about 10 micrometers to about 400 micrometers, more specifically about 25 micrometers to about 300 micrometers, most specifically about 50 micrometers to about 200 micrometers. The electrolyte can be fabricated by tape-casting, pressing, extruding, slip-casting, tape-calendaring, sintering, or the like, or a combination comprising at least one of the foregoing. The thickness of the cathode and anode are each independently about 1 micrometer to about 200 micrometers, more specifically about 5 micrometers to about 100 micrometers, most specifically about 10 micrometers to about 50 micrometers. The electrodes can be fabricated by screen printing, wet particle spraying, tape-calendaring, tape-casting, sintering, or the like, or a combination comprising at least one of the foregoing.

In another embodiment, the solid oxide electrolyzer cell 104 uses a cathode-supported design. In this embodiment, the thickness of the cathode is about 25 micrometers to about 2000 micrometers, more specifically about 50 micrometers to about 1000 micrometers, most specifically about 200 micrometers to about 500 micrometers.

The cathode can be fabricated by tape-casting, pressing or tape-calendaring and sintering.

The thickness of the electrolyte can be about 1 micrometer to about 100 micrometers, more specifically about 2 micrometers to about 50 micrometers, and most specifically about 5 micrometers to about 15 micrometers. The electrolyte can be fabricated by tape-casting, tape-calendaring, screen-printing, or wet particle spraying and sintering. In some cases, the cathode and electrolyte are co-sintered.

The thickness of the anode can be about 2 micrometers to about 200 micrometers, more specifically about 5 micrometers to about 100 micrometers, most specifically about 10 micrometers to about 50 micrometers. The anode can be fabricated by pressing, screen printing, wet particle spraying, tape-calendaring, tape-casting, sintering, or the like, or a combination comprising at least one of the foregoing.

As noted above, a portion of the hydrogen generated at the cathode is recycled to the solid oxide electrolyzer cell 104. An optional pump 105 such as for example a recycle blower or a recycle entrainment jet pump can be used to recycle the hydrogen to the solid oxide electrolyzer cell 104. Thus the gas supplied to the inlet of the cathode side is usually a mixture of steam and hydrogen. The mixture of steam and hydrogen mitigates corrosion to the nickel-based cathode.

The amount of cathode exhaust that is recycled and recombined with steam is about 5 wt % to about 25 wt %, based on the total amount of cathode exhaust. In one embodiment, the amount of cathode exhaust that is recycled is about 12 wt % to about 17 wt %, based on the total amount of cathode exhaust. An exemplary amount of cathode exhaust that can be recycled is about 15 wt %, based on the total amount of cathode exhaust.

The outlet temperature of the hydrogen and steam from the solid oxide electrolyzer cell 104 is about 725 to about 825° C. An exemplary outlet temperature for the hydrogen and steam emanating from the solid oxide electrolyzer cell 104 is about 750 to about 800° C. The outlet pressure of the hydrogen and steam from the solid oxide electrolyzer cell 104 is about 4 to about 12 kg/cm$^2$. An exemplary outlet temperature for the hydrogen and steam emanating from the solid oxide electrolyzer cell 104 is about 6 to about 10 kg/cm$^2$.

The exhaust steam along with the hydrogen generated in the solid oxide electrolyzer cell 104 are then cooled in a heat exchanger 106 that is located downstream from the solid oxide electrolyzer cell 104. The heat exchanger is a gas to gas heat exchanger. The heat exchange transfers heat extracted from the steam and the hydrogen to the air used on the anode side of the solid oxide electrolyzer cell 104. The outlet temperature of the hydrogen and steam from the heat exchanger 106 is about 600 to about 750° C. An exemplary outlet temperature for the hydrogen and steam emanating from the heat exchanger 106 is about 650 to about 725° C. The outlet pressure of the hydrogen and steam from the heat exchanger 106 is about 4 to about 12 kg/cm$^2$. An exemplary outlet temperature for the hydrogen and steam emanating from the heat exchanger 106 is about 6 to about 10 kg/cm$^2$.

As noted above, the hydrogen and steam from the heat exchanger 106 is then transferred to the feed water heater 108, where waste heat from the hydrogen and steam is used to preheat water that is converted to steam by the boiler 102. The outlet temperature of the hydrogen and steam from the feed water heater 108 is about 300 to about 450° C. An exemplary outlet temperature for the hydrogen and steam emanating from the feed water heater 108 is about 325 to about 375° C. The outlet pressure of the hydrogen and steam from the feed water heater 108 is about 4 to about 12 kg/cm$^2$. An exemplary outlet temperature for the hydrogen and steam emanating from the feed water heater 108 is about 6 to about 10 kg/cm$^2$.

The water is heated in the feed water heater 108 to a temperature of about 80 to about 225° C. In an exemplary embodiment, the water is heated in the feed water heater 108 to a temperature of about 125 to about 200° C. The steam and the hydrogen is then transferred to the condenser 110 where steam is condensed to water that is recycled to the feed water heater for re-conversion to steam at the boiler 102. At the condenser 110, steam is separated from hydrogen. The hydrogen obtained from the condenser 110 has a purity of greater than or equal to about 90%, based on the moles of the hydrogen and any impurities present. In one embodiment, the hydrogen obtained from the condenser 110 has a purity of greater than or equal to about 95%, based on the moles of the hydrogen and any impurities present. In another embodiment, the hydrogen obtained from the condenser 110 has a purity of greater than or equal to about 99%, based on the moles of the hydrogen and any impurities present. In an exemplary embodiment, the hydrogen obtained from the condenser 110 has a purity of greater than or equal to about 99.5%, based on the moles of the hydrogen and any impurities present.

As can be seen from the FIG. 1, the water condensate recovered from the condenser is blended with make-up water. This water is fed to the boiler to be converted to steam for electrolysis into hydrogen as detailed above.

The oxygen generated on the anode side generally has a purity of greater than or equal to about 90%, based on the moles of oxygen and any impurities present. In one embodiment, the oxygen generated on the anode side generally has a purity of greater than or equal to about 95%, based on the moles of the oxygen and any impurities present. In another embodiment, the oxygen generated on the anode side generally has a purity of greater than or equal to about 98%, based on the moles of the oxygen and any impurities present. In another embodiment, the oxygen generated on the anode side generally has a purity of greater than or equal to about 99%, based on the moles of the oxygen and any impurities present. In another embodiment, the oxygen generated on the anode side generally has a purity of greater than or equal to about 99.9%, based on the moles of the oxygen and any impurities present.

On the anode side of the hydrogen producing system 10, ambient air is used to dilute the oxygen concentrations as well as to carry away the waste heat. In one embodiment, oxygen rich anode exhaust is then passed through a turbine and exhausted. The turbine is in mechanical communication with a generator. The turbine is also in mechanical communication with an ambient air compressor to form a turbomachine that compresses air to below 12 kg/cm$^2$. The turbomachine operates on a simple air-breathing Brayton cycle. Electricity produced by the generator partially offsets the amount of electricity utilized from the grid.

On the anode side 200 of the hydrogen producing system 10, compressed air generated by the compressor 204 is first heated in the heat exchanger 106 (by heat extracted from the hydrogen and steam) to a temperature of about 650 to about 800° C. In an exemplary embodiment, the compressed air is heated by the heat exchanger 106 to a temperature of about 725 to about 775° C. The compressed air entering the heat exchanger 106 has a pressure of about 4 to about 12 kg/cm$^2$. An exemplary pressure for the compressed air entering the heat exchanger 106 is about 6 to about 10 kg/cm$^2$. The compressed air exiting the heat exchanger 106 has a pressure of about 4 to about 12 kg/cm$^2$. An exemplary pressure for the compressed air exiting the heat exchanger 106 is about 6 to about 10 kg/cm$^2$.

In exemplary embodiments depicted in the FIG. 2, the hydrogen producing system can comprise solid oxide electrolyzer cells 104, 114, 124, 134, and so on. The solid oxide electrolyzer cells 104, 114, 124 and the like, are in parallel fluid communication with one another and in series electrical communication with one another to form a stack. In one embodiment, at least up to about 5 cells can be connected in parallel. In another embodiment, at least up to about 10 cells can be connected in parallel. In yet another embodiment, at least up to about 25 cells can be connected in parallel. In yet another embodiment, at least up to about 50 cells can be connected in parallel. In yet another embodiment, at least up to about 100 cells can be connected in parallel. In an exemplary embodiment, an amount of greater than about 100 cells can be connected in parallel.

In one embodiment, the hydrogen and oxygen derived from the hydrogen producing system 10 can be stored in hydrogen and oxygen tanks respectively for use in a reversible type solid oxide electrolytic cell (not shown) that serves as a fuel battery to generate electricity as the occasion demands. As noted above, this method is advantageous for the production of hydrogen since the heat cycle used for the generation of hydrogen can be optimized separately and independently from whatever cycle is used to produce the majority of the electricity desired. This method advantageously results in hydrogen generation in an efficient manner and at a lower cost.

Those skilled in the art will recognize that the oxygen-rich air exiting the turbine is at a relatively high temperature and may have some value for its thermal energy. In one embodiment, the oxygen-rich air exiting the turbine is at a temperature of about 200 to about 500° C. In an exemplary embodiment, the oxygen-rich air exiting the turbine is at a temperature of about 400 to about 450° C. One potential method to utilize this thermal energy is to pass the exhaust through an optional heat recovery steam generator (HRSG). In one embodiment, the HRSG can comprise a shell-and-tube heat exchanger, wherein pressurized water is pumped through the tubes and is heated by the turbine exhaust. The water boils to steam and the steam can be further heated by the turbine exhaust to superheat steam. In one embodiment, this steam is expanded through a steam turbine connected to an electrical generator to generate electricity. In another embodiment, this steam is expanded through a steam turbine mechanically connected to the feed water pump on the cathode side and drives the feed water pump. In another embodiment, this steam is used for District Heating or other industrial uses.

The following examples, which are meant to be exemplary, not limiting, illustrate the methods of operation of the hydrogen producing system described herein.

EXAMPLE

This numerical example has been performed to demonstrate one exemplary method of functioning of the hydrogen producing system. This example has been conducted to demonstrate the advantages that are available by generating hydrogen according to the disclosed method.

FIG. 3 is a depiction of the system upon which the numerical example was performed. FIG. 3 comprises the same elements depicted in the FIG. 1. Each element in the FIG. 3 however, has its inlet and outlet points numbered. Table 1 shows the respective values (at each of the inlet and outlet points) for the water/steam pressure and temperature for an optimized system that generates electricity and steam.

TABLE 1

| Point # | Pressure (kg/cm$^2$) | Temperature (° C.) |
|---|---|---|
| 1 | 8.18 | 750 |
| 2 | 8.16 | 759 |
| 3 | 7.71 | 792 |
| 4 | 7.71 | 792 |
| 5 | 7.48 | 710 |
| 6 | 7.48 | 710 |
| 7 | 7.18 | 376 |
| 8 | 1.02 | 20 |
| 9 | 8.79 | 20.5 |
| 10 | 8.59 | 167 |
| 11 | 8.33 | 290 |
| 12 | 8.08 | 748 |
| 13 | 7.88 | 792 |
| 14 | 7.88 | 792 |
| 15 | 1.02 | 410 |
| 16 | 1.02 | 20 |
| 17 | 6.82 | 25 |

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A hydrogen producing system comprising:
a solid oxide electrolyzer cell having a cathode side and an anode side; wherein the cathode side comprises:
a heat exchanger that lies down stream of an outlet of the solid oxide electrolyzer cell; the outlet being located on the cathode side of the solid oxide electrolyzer cell;
a high temperature heat source that generates steam in a boiler at a temperature of about 700 to about 900° C. and a pressure of about 3 to about 20 kg/cm$^2$; and wherein the boiler is located upstream of the solid oxide electrolyzer cell; and further wherein the boiler is in fluid communication with an inlet located at the cathode side of the solid oxide electrolyzer cell; and wherein the anode side comprises:
a compressor located upstream of the solid oxide electrolyzer cell wherein the compressor is operative to blow air to sweep oxygen generated at the solid oxide electrolyzer cell to a turbine; and
the heat exchanger, wherein the heat exchanger lies upstream of an inlet on the anode side of the solid oxide electrolyzer cell; and wherein the heat exchanger is operative to extract heat from the steam and hydrogen emanating from the cathode side of the solid oxide electrolyzer cell; and further wherein a portion of the heat extracted is transferred to air that is provided to the anode side of the solid oxide electrolyzer cell.

2. The system of claim 1, further comprising an electrical grid that operates independently of the hydrogen producing system, but which provides electrical energy to facilitate an electrolysis of steam to hydrogen and oxygen.

3. The system of claim 1, further comprising a recycle loop; wherein the recycle loop emanates from an outlet of the cathode side of the solid oxide electrolyzer cell and is in fluid communication with the inlet located at the cathode side of the solid oxide electrolyzer cell; and wherein the recycle loop is operative to recycle a portion of the hydrogen generated in the solid oxide electrolyzer cell back to the cathode side.

4. The system of claim 3, wherein the recycle loop comprises a recycle blower or a recycle entrainment jet pump or a combination thereof.

5. The system of claim 1, further comprising a feed water heater.

6. The system of claim 1, further comprising a feed water heater on the cathode side of the solid oxide electrolyzer cell; wherein the feed water heater is located downstream of the heat exchanger and is in fluid communication with the heat exchanger.

7. The system of claim 6, wherein the feed water heater is located upstream of a condenser and in fluid communication with condenser.

8. The system of claim 7, wherein the condenser and the feed water heater are in a loop; wherein water generated in the condenser by the condensation of steam is recycled back to the feed water heater.

9. The system of claim 1, further comprising a plurality of solid oxide electrolyzer cells that are in parallel fluid communication with one another to form a stack.

10. The system of claim 9, wherein the plurality of solid oxide electrolyzer cells are in series electrical communication with one another.

11. The system of claim 1, wherein the compressor and the turbine are in operative communication with one another to form a turbomachine.

12. The system of claim 11, further comprising an electrical generator in operative communication with the compressor and the turbine.

13. The system of claim 11, wherein the turbomachine operates on a simple air breathing Brayton cycle that compresses air to an amount of less than or equal to about 12 $kg/cm^2$.

14. The system of claim 12, wherein the generator is in electrical communication with the solid oxide electrolyzer cell.

15. The system of claim 1, wherein the high temperature heat source is a nuclear reactor.

16. The system of claim 15, wherein the nuclear reactor is cooled with helium gas.

17. The system of claim 15, wherein the nuclear reactor is cooled with molten salt.

18. The system of claim 1, further comprising a heat recovery steam generator located downstream of the turbine and in fluid communication of the turbine; wherein the heat recovery steam generator is operative to extract heat from the turbine exhaust and transfer the heat to pressurized water in order to generate steam.

19. A method comprising:
generating steam at a temperature of about 700 to about 900° C. and a pressure of about 3 to about 20 $kg/cm^2$ using a high temperature heat source;
electrolyzing the steam to form hydrogen and oxygen in a solid oxide electrolyzer cell;
extracting heat from the hydrogen and steam to heat air in a heat exchanger; and
sweeping the oxygen from an anode side of the solid oxide electrolyzer cell to a turbine; wherein the sweeping the oxygen is conducted with compressed air generated in a compressor.

20. The method of claim 19, further comprising mixing a portion of hydrogen generated in the solid oxide electrolyzer cell with the steam to form mixed hydrogen and steam.

21. The method of claim 20, further comprising recycling the mixed hydrogen and steam to the solid oxide electrolyzer cell.

22. The method of claim 19, further comprising generating electricity in a generator that is in operative communication with the turbine.

23. The method of claim 22, further comprising feeding a portion of the electricity generated by the generator to the solid oxide electrolyzer cell.

24. The method of claim 19, wherein the electrolyzing of steam in the solid oxide electrolyzer cell is accomplished with electricity obtained from an independent electrical grid.

25. The method of claim 19, wherein the temperature of steam generated by the heat source is about 725 to about 800° C.

26. The method of claim 19, wherein the pressure of steam generated by the heat source is about 4 to about 12 $kg/cm^2$.

27. The method of claim 19, further comprising transferring steam and hydrogen from the heat exchanger to a feed water heater.

28. The method of claim 27, wherein heat extracted from the steam and hydrogen in the feed water heater is used to heat water.

29. The method of claim 19, wherein the hydrogen has a purity of greater than or equal to about 90%, based on the moles of hydrogen and any impurities present.

30. The method of claim 19, wherein the hydrogen has a purity of greater than or equal to about 95%, based on the moles of hydrogen and any impurities present.

31. The method of claim 19, wherein the hydrogen has a purity of greater than or equal to about 99%, based on the moles of hydrogen and any impurities present.

32. The method of claim 19, wherein the hydrogen has a purity of greater than or equal to about 99.5%, based on the moles of hydrogen and any impurities present.

33. The method of claim 20, wherein the hydrogen is mixed in an amount of about 5 wt % to about 25 wt %, based on the total mass of hydrogen and steam flowing through an outlet of the solid oxide electrolyzer cell.

34. The method of claim 19, wherein an outlet temperature of the hydrogen and steam from the solid oxide electrolyzer cell is about 725 to about 825° C. and wherein an outlet pressure of the hydrogen and steam from the solid oxide electrolyzer cell is about 6 to about 10 $kg/cm^2$.

35. The method of claim 19, wherein an outlet temperature of the hydrogen and steam from the heat exchanger is about 650 to about 750° C. and wherein an outlet pressure of the hydrogen and steam from the heat exchanger is about 6 to about 10 $kg/cm^2$.

36. The method of claim 27, wherein an outlet temperature of the hydrogen and steam from the feed water heater is about 340 to about 440° C. and wherein an outlet pressure of the hydrogen and steam from the feed water heater is about 6 to about 10 $kg/cm^2$.

* * * * *